3,243,605
SIMPLIFIED METHOD FOR SCR TURNOFF
Gerald E. Smith, Bethpage, and Frederick G. Moritz, Hauppauge, N.Y., assignors to Potter Instrument Company, Inc., Plainview, N.Y., a corporation of New York
Filed Aug. 8, 1963, Ser. No. 300,871
3 Claims. (Cl. 307—88.5)

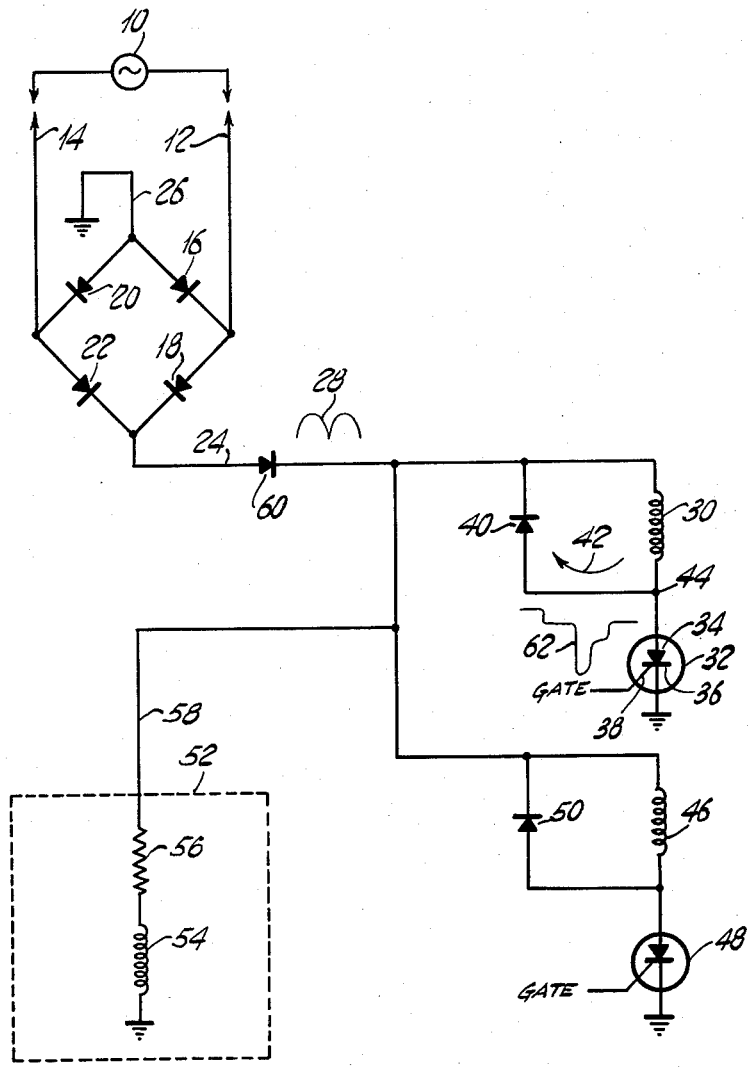

This invention relates to servo control equipment and, more particularly, relates to an improved circuit arrangement for ensuring turn-off of silicon controlled rectifiers used for the control of current flow through motor windings and the like.

Control of current flow through servo motor windings by a gated rectifier is, of course, known to the art and has been accepted by the art because of the ease of control of average current flow through the winding in response to an electrical signal, such as a phase controlled signal. For example, a thyratron serially coupled with the motor windings can perform such functions. With such circuitry, it is, of course, necessary that the gated rectifier be extinguished on every half cycle in order to enable control of the next current cycle. Due to the relatively high extinguishing potentials of commercially available thyratrons, extinguishing of the thyratrons has posed no special problem.

However, with the advent of gated solid state rectifiers such as SCR's, circuit difficulties have been encountered since the cathode-anode voltage must be dropped to below, in typical cases, 1 to 1½ volts to extinguish or turn off the gated rectifier. The inductance of the serially coupled motor winding often prevents dropping of the anode voltage below the extinguishing potential and the circuit will run away with the SCR's conducting over the full rectified cycle and the SCR gates having no effect on limitation of current flow.

It is, therefore, the primary object of this invention to provide an improved circuit to extinguish gated rectifiers used in control of current flow through inductive circuits.

In accordance with this object, there is provided, in a preferred embodiment of the present invention, an A.-C. source, a full wave bridge circuit coupled across said source to generate a full wave rectified voltage across output terminals of the bridge. The controlled inductive element, such as a servo motor winding, is serially coupled with the gate controlled rectifier, such as an SCR, across the output terminals of the bridge. A free-wheeling or quench diode is coupled in parallel with the motor winding. A choke is coupled across the output terminals of the bridge.

As the rectified voltage goes positive during each half cycle, a lagging current will flow through the choke. As the rectified voltage goes to 0, the choke will become a voltage source having a polarity which will drive the SCR anode negatively with respect to the cathode thereby to extinguish the SCR, enabling gate control of current flow in the next half cycle.

Having briefly described the invention, it will be described in greater detail in the following detailed description which may best be understood by reference to the accompanying figure, which is a schematic diagram of a servo control circuit in accordance with the present invention.

In the figure, there is shown a servo circuit, the power for which is supplied by source 10 which may, for example, comprise a 60 cycle, 115 volt A.-C. source coupled across a bridge circuit by leads 12 and 14. The bridge circuit comprises rectifiers 16, 18, 20 and 22 coupled together in a conventional bridge circuit to provide an output between the output terminals and leads 24 and 26, which consists of a full wave rectified voltage as indicated by wave form 28. The full wave rectified voltage 28 is coupled across the forward motor winding 30. In order to control the current flow through the motor winding, there is provided a silicone control rectifier 32 having an anode, cathode and gate electrode 34, 36 and 38 respectively. The motor winding is serially coupled with the anode-cathode circuit of the gated rectifier and the serially coupled combination is effectively connected across the bridge output terminals by connecting them between the source of voltage supply on lead 24 and ground.

The gated rectifier prevents current flow through the motor winding until such time as a gate signal is applied to the gate electrode 38 to fire the rectifier. After firing, the gate has no effect and the rectifier passes current for the remainder of the cycle of the applied voltage. To restore control of the conduction cycle to the gate for the next half wave, the anode-cathode voltage must be dropped below the positive (with respect to cathode) extinguishing potential and preferably driven a volt or two negative with respect to the cathode. The rectifier will extinguish and block conduction until again gated. The gate signal may be a positive-going pulse controlled as to time or a phase controlled full wave rectified A.-C. If the controlled element were merely a resistance, the SCR would be extinguished at each half cycle as the source potential goes to zero. However, with an inductive element, the element itself will operate as a voltage source, preventing dropping of the anode to zero.

To restrict the amplitude of the voltage induced across the winding 30 as source voltage 28 goes to zero, and, thus, restrict the amplitude of the voltage driving the anode positively with respect to the cathode, there is provided a quenching diode 40 coupled across the motor winding to provide a current return path as indicated by arrow 42. However, the quenching diode can, in general, do no better than to hold the junction 44 to approximately one volt positively when the line 24 is at zero. Since this voltage is very close to the critical extinguishing voltage of the gated rectifier, circuit operation is unreliable. For example, if the extinguishing voltage of a particular gated rectifier is below one volt, it would not extinguish and on the next half cycle, gate control would be lost and a full cycle of current would be established through the winding and rectifier, causing servo motor rotation at full speed.

As is conventional, a reversing motor winding 46 is provided with a control rectifier 48 and a quenching diode 50 in an identical parallel circuit.

As explained thus far, the circuit is conventional in nature having been utilized in servo motor operations by the prior art. As explained, the circuit operates at a critical level of reliability, requiring the selection of SCR's for their specific extinguishing potentials, and, thus, greatly increasing the cost of the circuit.

However, in accordance with the present invention, a choke 52 having inductance 54 and internal resistance 56 is effectively coupled across the output terminals of the bridge by coupling one end of the inductance via lead 58 to lead 24 and the other end to ground. As the source voltage, indicated by wave form 28 goes positively, current will flow through the choke 52 to ground, which current lags the applied voltage by a phase angle determined by the relative magnitudes of inductance 54 and the resistance 56. As the applied voltage decreases to zero and starts its next cycle, the inductance will, of course, tend to maintain the established current flow therethrough and as a result, the collapsing magnetic field will generate a voltage in the inductance as indicated, with lead 58 negative with respect to ground. A bleed path is provided through the bridge diodes to drive the lead 24 to a negative voltage dependent on the characteristics of the diodes, typically approximately two volts. It is often advantageous to include diode 60 at the output of the bridge circuit to further increase the negative voltage of lead 24 to approximately three volts at the junction between cycles of the rectified voltage.

Thus, at the instant when the rectified voltage goes to 0, lead 24 will be driven to −3 volts and anode 34 will be driven to approximately −2 volts due to the drop through the quenching diode 40. The anode voltage is plotted as the wave form 62. Since the choke provides a low impedance ground return, it is capable of driving the entire circuitry below the potential of the SCR cathode for a time determined by the inductance and resistance of the choke, which time is easily adjusted to turn off the SCR. For example, with a typical choke of 2 henries and 500 ohms, the anode will be driven negatively with respect to the cathode for 50–75 microseconds ensuring SCR turnoff.

Thus, it can be seen that the anode voltage is driven negatively between half cycles of the applied power voltage and the SCR will be turned off. With the next half cycle applied, the SCR will remain in the nonconductive state until such time as the gate circuit is provided with the requisite positive firing potential. Thus, in simple and expedient fashion, a circuit is provided in which full control may be afforded by the desired SCR's.

This invention may be variously modified and embodied within the scope of the subjoined claims.

What is claimed is:

1. A control circuit comprising a source of alternating voltage, a full wave bridge circuit coupled across said source to provide a full wave rectified voltage between the output terminals of said bridge, an inductive winding, a gated solid state rectifier having an anode, cathode and gate electrodes, said winding and said rectifier being serially coupled across said output terminals of said bridge, a quenching diode coupled across said winding, and a choke coupled across said output terminals of said bridge, said choke generating a potential driving said anode negative with respect to said cathode at each reversal of said rectified voltage.

2. A control circuit in accordance with claim 1 which includes a diode serially coupled between the output terminals of said bridge and both said choke and said winding.

3. In a circuit consisting of a full wave rectified voltage source having output means, a silicon controlled rectifier serially connected across said output means with an inductive load element and the controlled rectifier including an anode, cathode and gate electrodes, a quenching diode coupled across inductive load element, the improvement comprising an inductance coupled across said voltage source in parallel with said serially connected inductive load element and silicon controlled rectifier for generating a potential driving said anode negative with respect to each reversal of the rectified voltage of said source.

References Cited by the Examiner

UNITED STATES PATENTS 3,064,174  11/1962  Dinger _____ 318—331

ARTHUR GAUSS, *Primary Examiner.*

J. BUSCH, J. HEYMAN, *Assistant Examiners.*